(12) United States Patent
Maki et al.

(10) Patent No.: US 7,674,525 B2
(45) Date of Patent: Mar. 9, 2010

(54) PROCESS FOR PRODUCING FINE α-ALUMINA PARTICLES

(75) Inventors: Hajime Maki, Niihama (JP); Yoshiaki Takeuchi, Niihama (JP); Yuzuru Saitou, Niihama (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 659 days.

(21) Appl. No.: 11/374,968

(22) Filed: Mar. 15, 2006

(65) Prior Publication Data

US 2006/0210799 A1   Sep. 21, 2006

(30) Foreign Application Priority Data

Mar. 18, 2005   (JP) .............................. 2005-079002
Nov. 16, 2005   (JP) .............................. 2005-331289

(51) Int. Cl.
*C01F 7/38*   (2006.01)

(52) U.S. Cl. ................... 428/402; 428/403; 428/404; 428/405; 428/406; 428/407; 501/127; 501/153; 423/625; 423/626

(58) Field of Classification Search ......... 428/402–407; 427/212; 501/127, 153; 423/625, 626
See application file for complete search history.

(56) References Cited

U.S. PATENT DOCUMENTS 5,683,501 A * 11/1997 Tomihisa et al. ............ 106/491
6,855,412 B2 * 2/2005 Meguro et al. ............ 428/847.6
7,005,251 B2 * 2/2006 Kashiwagi et al. .......... 430/619
7,078,010 B2 * 7/2006 Maki et al. ................... 423/625
7,128,989 B2 * 10/2006 Hashimoto et al. ........ 428/844.5
7,307,033 B2 * 12/2007 Maki et al. ................... 501/127
7,351,394 B2 * 4/2008 Maki et al. ................... 423/625
7,384,560 B2 * 6/2008 Martens et al. .............. 210/695
7,531,234 B2 * 5/2009 Nakamura et al. ........... 428/328

FOREIGN PATENT DOCUMENTS

| GB | 1 032 230 A | 6/1966 |
| JP | 9-263406 A | 10/1997 |
| JP | 2000-344516 A | 12/2000 |
| WO | 01/30310 A1 | 5/2001 |

OTHER PUBLICATIONS

S. Rajendran et al., "Fabrication of a Fine Grained Alumina Ceramic", Key Engineering Materials, vols. 53-55, (1991), pp. 462-468.

* cited by examiner

*Primary Examiner*—Leszek Kiliman
(74) *Attorney, Agent, or Firm*—Sughrue Mion, PLLC (57) ABSTRACT

The present invention provides a process for producing fine α-alumina particles, which comprises sintering a mixture of α-alumina precursor particles and seed crystal particles, wherein a center particle diameter of the seed crystal particles is 40 nm or less, and a ratio of the number of coarse particles having a particle diameter greater than 100 nm to the number of the total particles is 1% or less.

6 Claims, 5 Drawing Sheets

PROCESS FOR PRODUCING FINE α-ALUMINA PARTICLES

BACKGROUND OF THE INVENTION

1. Field of the Invention

The present invention relates to a process for producing fine α-alumina particles, and in particular, to a process for producing fine α-alumina particles having fewer coarse particles.

2. Description of the Related Art

Fine α-alumina particles are fine particles of alumina [$Al_2O_3$] having an α-phase as the major crystalline phase and are used widely, for example, as a starting material for producing a sintered body such as a light transmitting tube. From the viewpoint of acquisition of a sintered body excellent in strength, such fine α-alumina particles are required to have fewer coarse particles.

As a process for producing fine α-alumina particles having a high degree of α-transformation and a high BET specific surface area, there is disclosed a process which comprises adding ammonia to an aqueous solution of an aluminum salt containing seed crystal particles to hydrolyze the aluminum salt, then distilling away water thereby giving a mixture of α-alumina precursor particles and the seed crystal particles, and sintering the mixture (Key Engineering Materials, Vols. 53-55, 462-468 (1991)).

However, the fine α-alumina particles obtained by the prior art process have a problem of relatively large number of coarse particles.

SUMMARY OF THE INVENTION

Accordingly, the present inventor conducted an extensive examination for developing a process capable of producing fine α-alumina particles having fewer coarse particles.

That is, the present invention provides a process for producing fine α-alumina particles, which comprises sintering a mixture of α-alumina precursor particles and seed crystal particles, wherein a center particle diameter of the seed crystal particles is 40 nm or less, and a ratio of the number of coarse particles having a particle diameter greater than 100 nm to the number of the total particles is 1% or less.

The present invention also provides fine particles of a metallic compound, which may be used as the seed crystal particles, wherein the center particle diameter of the particles is 40 nm or less and the ratio of the number of particles having a particle diameter greater than 100 nm to the number of the total particles is 1% or less.

The present invention further provides a process for producing the fine particles of a metallic compound, which process comprises the steps of milling an unmilled metallic compound such that the half width (H) of a main peak in the range of $45° \leq 2\theta \leq 70°$ in an X-ray diffraction spectrum thereof is at least 1.02 times as wide as the half width ($H_0$) before milling, and classifying the resulting milled product by centrifuging it in an aqueous medium such that the product of centrifugal acceleration (G) by centrifugation time (min) is 140,000 (G·min) or more; and a process for producing the fine particles of a metallic compound, which process comprises the steps of milling an unmilled metallic compound such that the half width (H) of a main peak in the range of $45° \leq 2\theta \leq 70°$ in an X-ray diffraction spectrum thereof is at least 1.02 times as wide as the half width ($H_0$) before milling, and classifying the resulting milled product through a filter having a pore diameter of 1 μm or less.

Fine α-alumina particles having fewer coarse particles can be produced according to the process of the present invention.

DETAILED DESCRIPTION OF THE PREFERRED EXAMPLES

The α-alumina precursor particles used in the present invention are particles of an α-alumina precursor that is a compound capable of conversion into α-alumina through α-transformation upon sintering, and examples thereof include particles of an aluminum salt, an aluminum alkoxide, aluminum hydroxide, and transition alumina.

The aluminum salt include, for example, aluminum inorganic salts such as aluminum chlorides such as aluminum chloride, aluminum nitrates such as aluminum nitrate and ammonium aluminum nitrate, ammonium alum, aluminum carbonates such as ammonium aluminum carbonate, and aluminum organic salts such as aluminum oxalate, aluminum acetate, aluminum stearate, aluminum lactate and aluminum laurate.

The aluminum alkoxide includes, for example, aluminum isopropoxide, aluminum ethoxide, aluminum s-butoxide and aluminum t-butoxide.

Particles of aluminum hydroxide include, for example, particles of aluminum hydrolyzed products obtained by hydrolyzing hydrolyzable aluminum compounds. The hydrolyzable aluminum compounds are those compounds from which aluminum hydrolyzed products can be derived through hydrolysis, and examples thereof include the same aluminum salts and aluminum alkoxides as described above.

Usually, an aluminum salt can be hydrolyzed by dissolving the aluminum salt in water to form an aqueous solution and then by adding a base thereto adjusting the hydrogen ion concentration of the aqueous solution usually to pH 3 or more and pH 13 or less, preferably pH 11 or less. The concentration of the aluminum salt in the aqueous solution of the aluminum compound is usually from 0.01 mol/L or more in terms of aluminum to a saturation concentration. Preferably the aluminum salt is completely dissolved in this aqueous solution, so the hydrogen ion concentration of the aqueous solution is usually pH 2 or less and usually pH 0 or more. Hydrolysis is carried out usually at a temperature of from 0° to 100° C.

The aqueous solution of the aluminum salt may include a solvent to be evaporated or lost at least by sintering. Such a solvent includes organic solvents, for example, polar organic solvents including alcohols such as methanol, ethanol, propanol and isopropanol, and non-polar organic solvents such as carbon tetrachloride, benzene and hexane.

As a base added to the aqueous solution of the aluminum salt, a metal-free base such as ammonia, ammonium hydrogen carbonate and ammonium carbonate is usually used. When ammonia is used, ammonia may be added in a gaseous state by blowing into the aqueous solution, but is preferably added as aqueous ammonia solution obtained by dissolving ammonia in water. When aqueous ammonia solution is used, a concentration of ammonia is usually from 0.01 mol/L to a saturation concentration.

For hydrolysis of the aluminum alkoxide, the aluminum alkoxide may be mixed and reacted with water. The amount of water used is usually in about from 1- to 10-molar excess to the aluminum atoms of the aluminum alkoxide. The aluminum alkoxide, when mixed with water, is easily hydrolyzed to form a hydrolyzed product.

By hydrolyzing the aluminum compound, an aqueous mixture containing water and a hydrolyzed product is usually obtained. The hydrolyzed product obtained by hydrolysis is usually water-insoluble, and thus the resulting aqueous mixture is usually in the state of a sol or gel or in the state of a dispersion of the hydrolyzed product in water.

The transition alumina includes, for example, γ-alumina, δ-alumina and θ-alumina.

The center particle diameter of the seed crystal particles used in the present invention is 40 nm or less, preferably 30 nm or less, more preferably 20 nm or less. Further, in the seed crystal particles, the ratio of the number of coarse particles having a particle diameter greater than 100 nm to the number of the total particles is 1% or less, preferably 0.5% or less, more preferably 0.3% or less, and the maximum particle diameter is usually 200 nm or less. The seed crystal particles include, for example, fine particles of a metallic compound obtained by milling an unmilled metallic compound and then classifying the resulting milled product by centrifuging it in an aqueous medium such that the product of centrifugal acceleration (G) by centrifugation time (min) is 140,000 (G·min) or more, preferably 170,000 (G·min) or more, more preferably 200,000 (G·min) or more and usually 1,200,000 (G·min) or less. By this centrifugation, coarse particles having a relatively large particle diameter are settled, while fine particles not settled remain suspended in a supernatant, so the supernatant is obtained by solid/liquid separation from the precipitates, whereby the objective seed crystal particles can be obtained.

The unmilled metallic compound used includes, for example, metal oxides such as alumina (aluminum oxide), iron oxide and chromium oxide, and metal hydroxides such as diaspore (aluminum hydroxide), and the unmilled metallic compound is preferably a compound having a corundum-type crystal form and more preferably being free of water of crystallization, or is diaspore. The metallic compound of corundum type free of water of crystallization includes, for example, α-alumina, α-iron oxide and α-chromium oxide, and α-alumina is preferably used because it is the same component as in the objective fine α-alumina particles.

The particle diameter of the unmilled metallic compound used is usually from 0.001 μm to 0.5 μm, preferably 0.005 μm or more, more preferably 0.01 μm or more, and the BET specific surface area thereof is preferably from 12 m²/g to 150 m²/g, more preferably not less than 15 m²/g.

The metallic compound may be milled by dry-milling it in a dry state without adding a liquid such as water, or may be milled by wet-milling it in a state moisten with a liquid.

For milling the metallic compound by dry-milling, it is possible to use a ball mill such as a rolling mill, a vibration mill and a planetary mill, a high-speed rotating mill such as a pin mill, and a milling apparatus such as a medium stirring mill and a jet mill.

In dry-milling, the unmilled metallic compound may be milled alone, but is preferably milled together with additives such as a grinding aid and a deflocculating agent to increase the efficiency of milling, and a grinding aid is preferably added to allow seed crystal particles after milling to be dispersed with sufficient dispersibility in water. The grinding aid includes, for example, alcohols such as methanol, ethanol and propanol; glycols such as propylene glycol, polypropylene glycol and ethylene glycol; amines such as triethanol amine; higher fatty acids such as palmitic acid, stearic acid and oleic acid; metal alkoxides such as aluminum alkoxide; and carbon materials such as carbon black and graphite, and these are used singly or as a mixture of two or more thereof. When an additive such as a grinding aid and a deflocculating agent is added, the amount of the additive added is usually 0.01 to 10 parts by mass, preferably 0.5 to 5 parts by mass, more preferably 0.75 to 2 parts by mass, relative to 100 parts by mass of the metallic compound.

For milling the metallic compound by wet-milling, the same milling apparatus as described above, for example a ball mill, a high-speed rotating mill and a medium stirring mill, can be used. The liquid used in wet-milling is usually water. The amount of the liquid is usually 100 parts by mass or more and 10000 parts by mass or less, relative to 100 parts by mass of the metallic compound. For milling with excellent dispersibility, milling with a dispersant added is preferable. The dispersant includes, for example, acids such as nitric acid, acetic acid, oxalic acid, hydrochloric acid and sulfuric acid, alcohols such as methanol, ethanol and isopropanol, aluminum salts such as aluminum chloride, aluminum oxalate, aluminum acetate and aluminum nitrate, and surfactants, and these dispersants are used alone or as a mixture of two or more thereof. When the dispersant is used, the amount of the dispersant is usually about 0.01 to 20 parts by mass, preferably 0.05 to 10 parts by mass, more preferably 0.1 to 5 parts by mass, relative to 100 parts by mass of the liquid.

From the viewpoint of acquisition of a relative large amount of the fine particles having the particle diameter defined in the present invention, it is preferable that milling of the metallic compound is conducted generally until the half width (H) of a main peak in the range of $45° \leq 2\theta \leq 70°$ in an X-ray diffraction spectrum thereof becomes at least 1.02 times, preferably at least 1.1 times, more preferably at least 1.3 times and usually up to 3.0 times (particularly in dry-milling, at least 1.06 times) as wide as the half width ($H_0$) before milling. Usually, the half width (H) of the main peak is increased as fine particles formed are increased with the progress of milling, so usually milling is continued until the half width (H) is increased to the range mentioned above.

The aqueous medium used in the above-mentioned centrifugation includes, for example, aqueous solutions of the aluminum salts or the acids illustrated above as the dispersant, in addition to purified water.

The centrifugation can be carried out using a usual centrifuge. The time required for centrifugation may be time enough to cause sedimentation of coarse particles having a relatively large particle diameter contained in the milled material, and is usually not less than 15 minutes and not more than 12 hours.

By such centrifugation, coarse particles are settled while the objective fine particles of the metallic compound remain dispersed in the supernatant without sedimentation, so the objective fine particles of the metallic compound can be obtained as the supernatant after centrifugation.

The seed crystal particles used in the present invention also include fine particles of a metallic compound obtained by milling an unmilled metallic compound in the same manner as above and then classifying the resulting milled product by filtration through a filter having a pore diameter of 1 μm or less, preferably 0.7 μm or less, more preferably 0.3 μm or less and usually 0.01. μm or more, preferably 0.05 μm or more.

As the filter, a commercial filter made of ceramics such as α-alumina can be used.

In filtration, for example slurry having the milled product dispersed in an aqueous medium is passed through the filter. The aqueous medium includes aqueous solutions of the aluminum salts or the acids illustrated above as the dispersant, in addition to purified water.

By such filtration, coarse particles are captured by the filter, while the objective fine particles of the metallic compound, together with the liquid, pass through the filter without being captured thereby, and thus the objective fine particles of the metallic compound can be obtained as the filtrate after filtration.

From the viewpoint of easy acquisition of fine particles of α-alumina having a high degree of α-transformation, it is preferable that when a metal oxide or a metal hydroxide is used as the metallic compound, the amount of the seed crystal particles used in the present invention, in terms of metal oxide, is at least 0.1 part by mass, preferably at least 1 part by mass, more preferably at least 2 parts by mass, relative to 100 parts by mass of the total amount of the α-alumina precursor particles and the seed crystal particles. The amount of the seed crystal particles used may be higher than 50 parts by mass, and since the productivity decreases as the amount of the seed crystal particles increases, the amount of the seed crystal particles is usually up to 50 parts by mass, preferably up to 40 parts by mass, more preferably up to 25 parts by mass.

The mixture of the α-alumina precursor particles and the seed crystal particles can be prepared by mixing, under stirring, the α-alumina precursor particles with the separately prepared seed crystal particles. Alternatively, the mixture can be prepared by mixing the α-alumina precursor particles with the seed crystal particles under stirring in water with a wet-mixing machine such as a medium stirring mill.

In preparing the mixture, although the seed crystal particles may be used in a dry state, they are preferably used in the form of a dispersion in water so that the seed crystal particles can be dispersed more uniformly, and depending on the composition of a supernatant after centrifugation or a filtrate after filtration, the supernatant or the filtrate can be added directly as the dispersion.

From the viewpoint of easy acquisition of the mixture having the α-alumina precursor particles and the seed crystal particles mixed uniformly with one another, it is preferable that for example, (1) when the α-alumina precursor is a water-soluble aluminum salt, the mixture is prepared by adding the dispersion of the seed crystal particles to an aqueous solution having the α-alumina precursor dissolved in water, then distilling the water away from this aqueous solution thereby precipitating the aluminum salt, whereby the mixture of the aluminum salt particles and the seed crystal particles is obtained, or (2) when the α-alumina precursor is an aluminum hydrolyzed product, the mixture is produced by previously adding the dispersion of the seed crystal particles to an aqueous solution of a hydrolyzable aluminum compound, then hydrolyzing the hydrolyzable aluminum compound in this aqueous solution thereby depositing the resulting aluminum hydrolyzed product, and evaporating water therefrom, whereby the mixture of the aluminum hydrolyzed product particles and the seed crystal particles is obtained, or (3) when the α-alumina precursor is an aluminum hydrolyzed product, the mixture is produced by adding the aluminum hydrolyzed product particles to the dispersion of the seed crystal particles, then mixing them with grinding mill, homogenizer or wet type jet-mill, and evaporating water therefrom, whereby the mixture of the aluminum hydrolyzed product particles and the seed crystal particles is obtained.

After precipitation or hydrolysis of the aluminum salt, a mixture having the aluminum salt or the aluminum hydrolyzed product and the seed crystal particles dispersed uniformly therein can be obtained for example by evaporating water therefrom. The temperature for evaporating water is usually 100° C. or less, but water may be rapidly removed for example by a spray dryer at a temperature higher than 100° C. By removing water, the mixture can be obtained in a dry state.

In the present invention, the mixture is, then, subjected to be sintered. From the viewpoint of easy acquisition of the fine α-alumina particles with a high degree of α-transformation, the sintering temperature is usually 600° C. or more, preferably 700° C. or more, and from the viewpoint of less necking among the particles, the sintering temperature is usually 1100° C. or less, preferably 1000° C. or less, more preferably 950° C. or less.

The mixture is heated to the sintering temperature at a temperature increasing rate of for example from 60° C./hour to 1200° C./hour, and from the viewpoint of easy acquisition of the fine α-alumina particles with less necking, the mixture is heated at a temperature increasing rate of up to 500° C./hour, preferably up to 200° C./hour and usually at least 60° C./hour, in at least the temperature range of 150° C. to 600° C.

As the temperature is increased, gaseous byproducts attributable to the aluminum compound are generated depending on the type of the aluminum compound used as the starting material, so the temperature is increased to the sintering temperature after a temperature of less than 600° C. is maintained until generation of such byproducts is terminated.

The mixture may be sintered in the air or may be sintered in an inert gas such as nitrogen gas and argon gas. Alternatively, the mixture may be sintered in a dry atmosphere with a low partial pressure of water vapor.

For sintering, it is possible to use a usual sintering furnace such as a tubular electric furnace, a box-shaped electric furnace, a tunnel furnace, a far infrared furnace, a microwave heating furnace, a shaft furnace, a reverberatory furnace, a rotary furnace and a roller hearth type kiln. The mixture may be sintered in a batch-wise system or a continuous system. Alternatively, the mixture may be sintered in a stationary system or a fluidized system.

The sintering time may be time enough to convert the mixture of the α-alumina precursor particles and the seed crystal particles through α-transformation into fine α-alumina particles with a high degree of α-transformation, and for example, the sintering time is not less than 10 minutes and not more than 24 hours, depending on the type of the α-alumina precursor used, the ratio of the α-alumina precursor to the seed crystal particles used, the form of the sintering furnace, the sintering temperature and sintering atmosphere.

The fine α-alumina particles thus obtained have a particle diameter of about from 0.01 to 0.1 μm and exhibits both a high degree of α-transformation and a large BET specific surface area, and for example, the degree of α-transformation is 90% or more, preferably 95% or more, and the BET specific surface area is usually not less than 10 m$^2$/g, preferably not less than 13 m$^2$/g, more preferably not less than 15 m$^2$/g and usually not higher than 150 m$^2$/g, preferably not higher than 100 m$^2$/g.

The resulting fine α-alumina particles may be milled. For milling the fine α-alumina particles, for example, a medium milling machine such as a vibration mill and a ball mill or a jet mill can be used. The resulting fine α-alumina particles may be classified.

The α-alumina thus obtained is useful as a starting material for producing an α-alumina sintered body, for example. The α-alumina sintered body is used as a material of a cutting tool, bioceramics and a bulletproof plate where high strength is required. Equipment parts for production of semiconductors such as wafer handlers and electronic parts such as enzyme sensors can also be mentioned. Light transmitting tubes such as a sodium lamp and a metal halide lamp can also be mentioned. Ceramics filters used in removing solids contained in gases such as exhaust gas, in filtering an aluminum melt and in filtering foods and drinks such as beer, can also be mentioned. The ceramics filters include selective permeation filters for selective permeation of hydrogen in a fuel cell and for selective permeation of gaseous components generated in petroleum refining, as well as carbon monoxide, carbon dioxide, nitrogen and oxygen, and these selective permeation filters may also be used as a catalyst carrier for supporting a catalytic component on the surface thereof.

The resulting fine α-alumina particles are used as an additive for cosmetics, an additive for brake lining and as a catalyst carrier, or as a material such as an electroconductive sintered body and a thermally conductive sintered body.

In producing a sintered body by sintering hardly sintered ceramics powder, the resulting fine α-alumina particles can also be used as a sintering assistant to be added to the ceramics powder for facilitating sintering.

The resulting fine α-alumina particles can be used as a starting material, whereby fine aluminum nitride powder, yttrium-aluminum-garnet (YAG) powder, powdery fluorescent body, etc., can be produced.

The resulting fine α-alumina particles can also be used as an additive in a powdery form which similar to usual α-alumina powder, is added to a coating layer of a coating magnetic medium in order to improve head cleaning properties and rubbing resistance. The fine α-alumina particles can also be used as toners. The fine α-alumina particles can also be used as fillers added to a resin. The fine α-alumina particles can also be used as an abrasive, can be formed for example into slurry of the particles dispersed in a medium such as water and used in polishing semiconductor CMP and hard disk substrates, or can be applied onto the surface of a tape and used in precision polishing of parts such as a hard disk and a magnetic head.

EXAMPLES

Hereinafter, the present invention is described in more detail by reference to Examples, but the present invention is not limited by these Examples.

The degree of α-transformation in the fine α-alumina particles obtained in each of the Examples was calculated from the peak height ($I_{25.6}$) of alumina α-phase (012 plane) appearing at the position of 2θ=25.6° and the peak height ($I_{46}$) of γ-phase, η-phase, χ-phase, κ-phase, θ-phase and δ-phase appearing at the position of 2θ=46° in a diffraction spectrum of the fine α-alumina particles with a powder X-ray diffractometer (RINT2000 manufactured by Rigaku Corporation) using CuKα radiation at a tube voltage of 40 kV and a tube current of 20 mA, on the basis of the following formula (1):

Degree of α-transformation=$I_{25.6}/(I_{25.6}+I_{46})\times 100$ (%)     (1)

The BET specific surface area was determined by a nitrogen absorption method.

The degree of necking was determined as the proportion of particles connected by necking to adjacent particles, in arbitrary 20 or more particles, on a transmission electron microphotograph (TEM photograph).

The degree of pulverization was determined from the half width (H (116)) of an X-ray diffraction peak (2θ=57.5°) of the α-phase (116) plane and the half width ($H_0$ (116)) of an X-ray diffraction peak of the α-phase (116) plane of the seed crystals (α-alumina) before milling, on the basis of the following formula (2):

Degree of pulverization=$H(116)/H_0(116)$     (2)

Example 1

[Production of Seed Crystal Particles]

Aluminum hydroxide obtained by hydrolyzing aluminum isopropoxide was calcinated to give intermediate alumina containing a θ-phase as the major crystalline phase and 3 mass % α-phase, and this intermediate alumina was milled with a jet mill to give an alumina powder having a bulk density of 0.21 g/cm³.

The alumina powder obtained above was introduced continuously into a furnace of an atmosphere filled with dry air of a dew point of −15° C. (water vapor partial pressure 165 Pa), while being continuously discharged in an average retention time of 3 hours, and sintered at the highest temperature of 1170° C. to give α-alumina particles having a BET specific surface area of 14 m²/g.

1 part by mass of a grinding aid (propylene glycol) was added to 100 parts by mass of the α-alumina particles, and then grinding medium (alumina beads of beads diameter of 15 mm) was added thereto, which were then milled with a vibration mill for 12 hours. The BET specific surface area of the α-alumina particles after milling was 16.6 m²/g, the degree of pulverization thereof was 1.10, and the center particle diameter thereof was 0.1 μM.

The α-alumina particles milled as described above, 20 parts by mass, were mixed with 80 parts by mass of an aqueous aluminum chloride solution (aluminum chloride concentration, 0.01 mol/L) and wet-dispersed continuously in an average retention time of 15 minutes with a wet dispersing machine (Dyno-Mill manufactured by Shinmaru Enterprises Corporation) filled with 2.9 kg alumina beads (beads diameter 0.65 mm) and then subjected to solid/liquid separation by centrifugation for 40 minutes at a revolution number of 4000 rpm (centrifugal acceleration of about 2100 G) to give, as a liquid phase (supernatant), slurry (solids content 1.1 mass %) containing a fine α-alumina particles (degree of pulverization, 1.4).

Figure 1:
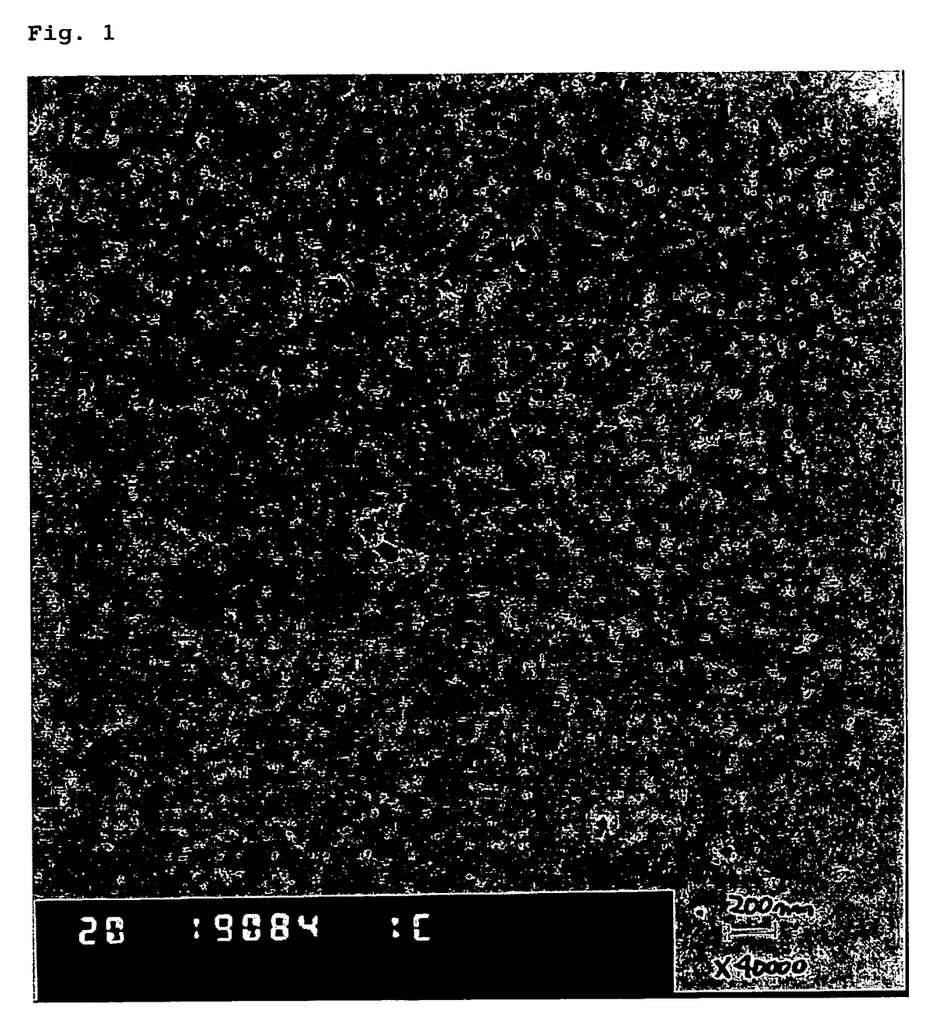
FIG. 1 is a transmission electron microphotograph of fine particles contained in the supernatant obtained in Example 1.
Figure 2:
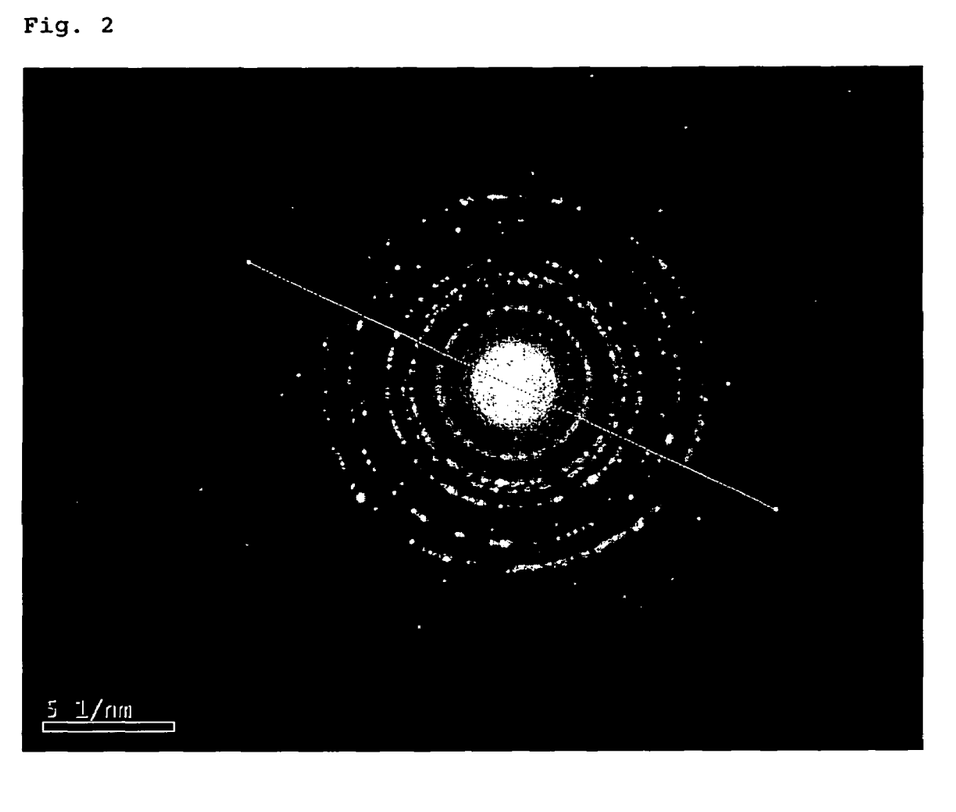
FIG. 2 is an electron diffraction photograph, by a transmission electron microscope, of fine particles contained in the supernatant obtained in Example 1.

This slurry, 130 g, was further subjected to solid/liquid separation by centrifugation (344,000 G·min) for 40 minutes at a revolution number of 12000 rpm (centrifugal acceleration of about 8600 G) to give 118 g of supernatant (solids content 0.17 mass %). When the supernatant was observed with the naked eye, it was colorless and transparent, and fine particles could not be observed. When the particle diameters of the fine particles contained in the supernatant were determined by drying the supernatant and then observing its residues under a transmission electron microscope (TEM), the majority of the fine particles had a particle diameter of 20 nm or less; and per about 1500 fine particles having a particle diameter of 20 nm or less, the number of particles having a particle diameter of more than 20 nm and less than 100 nm was 1 and the number of particles having a particle diameter of 100 nm or more was 1, and particles having a particle diameter of 200 nm or more were not observed. The center particle diameter of the fine particles was 20 nm or less. A transmission electron microphotograph (TEM photograph) of the fine particles is shown in FIG. 1. By electron diffraction using TEM, the crystal structure of the fine particles contained in the supernatant was confirmed to be α-alumina. An electron diffraction photograph of the fine particles is shown in FIG. 2.

[Production of Aluminum Hydrolyzed Product]

The resulting supernatant (solids content, 0.17 mass %), 118 g (fine α-alumina particles, 0.2 g), was mixed with 60.4 g (0.25 mol) of aluminum chloride hexahydrate ($AlCl_3 \cdot 6H_2O$) (special grade in a powdery form, manufactured by Wako Pure Chemical Industries, Ltd.) and 84.6 g of purified water at room temperature (about 25° C.) to form an aqueous solution, and while the mixture was stirred at the same temperature, 25% ammonia water (special grade, manufactured by Wako Pure Chemical Industries, Ltd.), 42 g (ammonia 10.5 g), was added at a rate of about 4 g/min. with a micro rotary pump, whereby slurry from which a hydrolyzed product had been precipitated was obtained. The hydrogen ion concentration of this slurry was pH 3.8. When this slurry was left at room temperature (about 25° C.) for 1 day, the hydrolyzed product was gelled to form a gelled material. The gelled material was dried in a thermostatic bath at 60° C. to give a dried mixture of the hydrolyzed product and the seed crystal particles. 100 parts by mass of the dried mixture contained 1.5 parts by mass of the seed crystal particles, in terms of metal oxide.

[Sintering]

Figure 3:
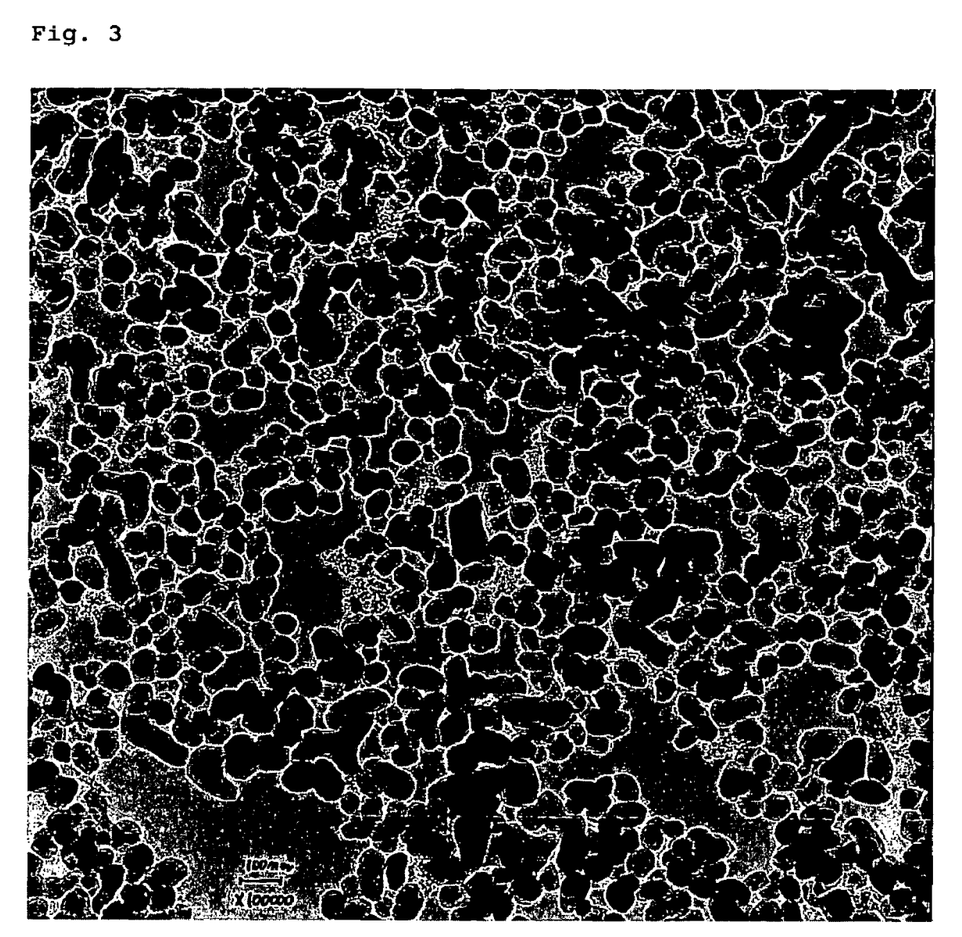
FIG. 3 is a transmission electron microphotograph of the fine α-alumina particles obtained in Example 1.

This dried mixture was ground to a powder with an alumina mortar, then placed into an alumina crucible, heated to 500° C. at a temperature increasing rate of 150° C./hour in the air in a box-shaped electric furnace and kept at the same temperature for 1 hour and cooled to room temperature (about 25° C.). Thereafter, the particles were heated to 900° C. at a temperature increasing rate of 300° C./hour in the air in the same electric furnace and sintered at the same temperature for 3 hours to give fine α-alumina particles. The fine α-alumina particles were highly white, and the degree of α-transformation was 97.8%, and the BET specific surface area was 17.3 $m^2/g$. When the fine α-alumina particles were observed under TEM, particles connected via necking to adjacent particles were not observed. A TEM photograph of the fine α-alumina particles is shown in FIG. 3.

Example 2

[Production of Seed Crystal Particles]

Slurry (solids content 1.1 mass %) containing fine α-alumina particles (degree of pulverization 1.4) was obtained in the same procedure as in Example 1. The slurry, 138.9 g, was further subjected to solid/liquid separation by centrifugation (344,000 G·min) for 40 minutes at a revolution number of 12000 rpm (centrifugal acceleration of about 8600 G) to give 94.4 g of supernatant (solids content 0.17 mass %). When the supernatant was observed with the naked eye, it was colorless and transparent, and fine particles could not be observed. When the particle diameters of the fine particles contained in the supernatant were determined in the same manner as in Example 1, the majority of the fine particles had a particle diameter of 20 nm or less; and per about 1500 fine particles having a particle diameter of 20 nm or less, the number of particles having a particle diameter of more than 20 nm and less than 100 nm was 1 and the number of particles having a particle diameter of 100 nm or more was 2, and particles having a particle diameter of 200 nm or more were not observed. The center particle diameter of the fine particles was 20 nm or less. It was confirmed in the same manner as in Example 1 that the crystal structure of the fine particles contained in the supernatant was α-alumina.

[Production of Aluminum Hydrolyzed Product]

The resulting supernatant (solids content, 0.17 mass %), 94.4 g (fine α-alumina particles, 0.16 g), 25 g of aluminum hydroxide obtained by hydrolyzing aluminum isopropoxide, and 105.6 g of purified water at room temperature (about 25° C.), were mixed with one another and introduced into a sand grinder and stirred at 2000 rpm for 30 minutes, followed by evaporating water under reduced pressure in a rotary evaporator on a water bath at 60° C., to give a dried mixture in a powdery form.

[Sintering]

This dried mixture was placed in an alumina crucible, heated to 980° C. at a temperature increasing rate of 300° C./hour in the air in a box-shaped electric furnace and sintered at the same temperature for 3 hours to give fine α-alumina particles. The fine α-alumina particles were highly white, and the degree of α-transformation was 98%, and the BET specific surface area was 14 $m^2/g$. When the fine α-alumina particles were observed under TEM, particles connected via necking to adjacent particles were not observed.

Example 3

[Production of Seed Crystal Particles]

α-Alumina particles were obtained in the same manner as in Example 1 from aluminum hydroxide obtained by hydrolyzing aluminum isopropoxide. The BET specific surface area of the α-alumina particles was 17.2 $m^2/g$, the degree of pulverization thereof was 1.10, and the center particle diameter thereof was 0.1 μm. 20 parts by mass of the α-alumina particles were mixed with 80 parts by mass of an aqueous aluminum chloride solution (aluminum chloride concentration, 0.01 mol/L) and wet-dispersed continuously in an average retention time of 17 minutes with a wet dispersing machine (Dyno-Mill manufactured by Shinmaru Enterprises Corporation) filled with 2.9 kg alumina beads (beads diameter 0.65 mm) and then subjected to solid/liquid separation by centrifugation for 20 minutes at a revolution number of 4000 rpm (centrifugal acceleration of about 2100 G) to give, as a liquid phase, slurry (solids content 4.0 wt %) containing fine α-alumina particles (degree of pulverization, 1.2).

This slurry, 40.6 g, was further subjected to solid/liquid separation by centrifugation (344,000 G·min) for 40 minutes at a revolution number of 12000 rpm (centrifugal acceleration of about 8600 G) to give 22.8 g of supernatant (solids content 0.15 wt %). When the supernatant was observed with the naked eye, it was colorless and transparent, and fine particles could not be observed. When the particle diameters of the fine particles contained in the supernatant were determined in the same manner as in Example 1, the majority of the fine particles had a particle diameter of 20 nm or less; and per about 1500 fine particles having a particle diameter of 20 nm or less, the number of particles having a particle diameter of more than 20 nm and less than 100 nm was 1 and the number of particles having a particle diameter of 100 nm or more was 2, and particles having a particle diameter of 200 nm or more were not observed. The center particle diameter of the fine particles was 20 nm or less. It was confirmed in the same manner as in Example 1 that the crystal structure of the fine particles contained in the supernatant was α-alumina.

[Production of Aluminum Hydrolyzed Product]

The resulting supernatant (solids content, 0.15 wt %), 22.8 g (fine α-alumina particles, 0.03 g), was mixed with 93.8 g (0.25 mol) of aluminum nitrate nonahydrate ($Al(NO_3)_3 \cdot 9H_2O$) (special grade in a powdery form, manufactured by Wako Pure Chemical Industries, Ltd.) and 186.2 g of purified water at room temperature (about 25° C.) to form an aqueous solution, and while the mixture was stirred at the same temperature, 25% ammonia water (special grade, manufactured by Wako Pure Chemical Industries, Ltd.), 41.5 g (ammonia 10.4 g), was added at a rate of about 4 g/min., whereby slurry from which a hydrolyzed product had been precipitated was obtained. The hydrogen ion concentration of this slurry was pH 4.0. When this slurry was left at room temperature (about 25° C.) for 1 day, the hydrolyzed product was gelled to form a gelled material. The gelled material was dried in a thermostatic bath at 60° C. to give a dried mixture of the hydrolyzed product and the seed crystal particles. 100 parts by mass of the dried mixture contained 0.2 part by mass of the seed crystal particles, in terms of metal oxide.

[Sintering]

This dried mixture was ground to a powder with an alumina mortar, then placed in an alumina crucible, heated to 940° C. at a temperature increasing rate of 300° C./hour in the air in a box-shaped electric furnace and sintered at the same temperature for 3 hours to give fine α-alumina particles. The fine α-alumina particles were slightly colored, and the degree of α-transformation was 97.6%, and the BET specific surface area was 18.3 $m^2/g$. When the fine α-alumina particles were observed under TEM, particles connected via necking to adjacent particles were not observed.

Example 4

[Production of Seed Crystal Particles]

Slurry (solids content 4.0 mass %) containing fine α-alumina particles (degree of pulverization, 1.2) was obtained in the same manner as in Example 1. This slurry, 40.6 g, was further subjected to solid/liquid separation by centrifugation (344,000 G·min) for 40 minutes at a revolution number of 12000 rpm (centrifugal acceleration of about 8600 G) to give 23.0 g of supernatant (solids content 0.15 mass %). When the supernatant was observed with the naked eye, it was colorless and transparent, and fine particles could not be observed. When the particle diameters of the fine particles contained in the supernatant were determined in the same manner as in Example 1, the majority of the fine particles had a particle diameter of 20 nm or less; and per about 1500 fine particles having a particle diameter of 20 nm or less, the number of particles having a particle diameter of more than 20 nm and less than 100 nm was 1 and the number of particles having a particle diameter of 100 nm or more was 2, and particles having a particle diameter of 200 nm or more were not observed. The center particle diameter of the fine particles was 20 nm or less. It was confirmed in the same manner as in Example 1 that the crystal structure of the fine particles contained in the supernatant was α-alumina.

The resulting supernatant (solids content, 0.15 mass %), 23.0 g (fine α-alumina particles, 0.03 g), was mixed with 93.8 g (0.25 mol) of aluminum nitrate nonahydrate $(Al(NO_3)_3 \cdot 9H_2O)$ (special grade in a powdery form, manufactured by Wako Pure Chemical Industries, Ltd.) and 186 g of purified water at room temperature (about 25° C.) to form an aqueous solution, and the mixture was dried under stirring at the same temperature by evaporating water away with a rotary evaporator on a water bath at 60° C., to give a powdery dried mixture of the hydrolyzed product and the seed crystal particles. 100 parts by mass of the dried mixture contained 0.02 part by mass of the seed crystal particles, in terms of metal oxide.

[Sintering]

This dried mixture was placed in an alumina crucible, heated to 820° C. at a temperature increasing rate of 300° C./hour in the air in a box-shaped electric furnace and sintered at the same temperature for 3 hours to give fine α-alumina particles. The fine α-alumina particles were slightly colored, and the degree of α-transformation was 97.8%, and the BET specific surface area was 17.5 $m^2/g$. When the fine α-alumina particles were observed under TEM, particles connected via necking to adjacent particles were not observed.

Example 5

[Production of Seed Crystal Particles]

α-Alumina particles were obtained in the same manner as in Example 1 from aluminum hydroxide obtained by hydrolyzing aluminum isopropoxide. The BET specific surface area of the α-alumina particles was 14.0 $m^2/g$, the degree of pulverization thereof was 1.10, and the center particle diameter thereof was 0.1 µm. 20 by mass of the α-alumina particles were mixed with 80 parts by mass of an aqueous aluminum chloride solution (aluminum chloride concentration, 0.01 mol/L) and wet-dispersed continuously in an average retention time of 17 minutes with a wet dispersing machine (Dyno-Mill) filled with 2.9 kg alumina beads (beads diameter 0.65 mm), and then filtered at a flow rate of 4 m/sec. (0.15 L/min.) through an α-alumina ceramics filter (manufactured by NGK Insulators, Ltd.) to give a filtrate. When the filtrate was observed with the naked eye, it was colorless and transparent, and fine particles could not be observed. When the particle diameters of the fine particles contained in the supernatant were determined in the same manner as in Example 1, the majority of the fine particles had a particle diameter of 20 nm or less; and the number of particles having a particle diameter of more than 20 nm and less than 100 nm was 1 per about 3000 fine particles having a particle diameter of 20 nm or less, and particles having a particle diameter of 100 nm or more were not observed. The center particle diameter of the fine particles was 20 nm or less. It was confirmed in the same manner as in Example 1 that the crystal structure of the fine particles contained in the supernatant was α-alumina.

[Production and Sintering of Aluminum Hydrolyzed Product]

Excellent fine α-alumina particles will be obtained in the same manner as in Example 1 except that the filtrate obtained above would be used in place of the supernatant obtained in Example 1.

Example 6

A filtrate was obtained in the same manner as in Example 1 except that an alumina ceramics filter having a pore diameter of 0.2 µm (manufactured by NGK Insulators, Ltd.) was used in place of the α-alumina ceramics filter having a pore diameter of 0.1 µm. When the filtrate was observed with the naked eye, it was colorless and transparent, and fine particles could not be observed. When the filtrate was dried and fine particles remaining as residues were measured for their particle diameters in the same manner as in Example 1, the majority of the fine particles had a particle diameter of 20 nm or less; and per about 3000 fine particles having a particle diameter of 20 nm or less, the number of particles having a particle diameter of more than 20 nm and less than 100 nm was 1 and the number of particles having a particle diameter of 100 nm or more was 1, and particles having a particle diameter of 200 nm or more were not observed. The center particle diameter of the fine particles was 20 nm or less. It was confirmed in the same manner as in Example 1 that the crystal structure of the fine particles was α-alumina.

[Production and Sintering of Aluminum Hydrolyzed Product]

Excellent fine α-alumina particles will be obtained in the same manner as in Example 1 except that the filtrate obtained above would be used in place of the supernatant obtained in Example 1.

Example 7

[Production of Seed Crystal Particles]

20 parts by mass of the α-alumina particles (BET specific surface area, 16.6 m$^2$/g; degree of pulverization, 1.10; center particle diameter, 0.1 μm) obtained after milling in Example 1 were mixed with 80 parts by mass of an aqueous aluminum chloride solution (aluminum chloride concentration, 0.01 mol/L; hydrogen ion concentration, pH 2) and wet-dispersed continuously in an average retention time of 5 minutes with a wet dispersing machine (Dyno-Mill) filled with 2.9 kg alumina beads (beads diameter 0.65 mm), and then subjected to solid/liquid separation by centrifugation for 40 minutes at a revolution number of 4000 rpm (centrifugal acceleration of about 2100 G) to give, as a supernatant, slurry (solids content 1.4 mass %) containing the fine α-alumina particles (degree of pulverization, 1.4).

This slurry was further subjected to solid/liquid separation by centrifugation (152,000 G·min) for 40 minutes at a revolution number of 8000 rpm (centrifugal acceleration of about 3800 G) to give a supernatant (solids content 0.26 mass %).

[Production of Aluminum Hydrolyzed Product]

The resulting supernatant (solids content, 0.26 mass %), 366 g (fine α-alumina particles, 1 g), was mixed with 60.4 g (0.25 mol) of aluminum chloride hexahydrate (AlCl$_3$.6H$_2$O) (special grade in a powdery form, manufactured by Wako Pure Chemical Industries, Ltd.) at room temperature (about 25° C.), and while the mixture was stirred at the same temperature, 25% ammonia water (special grade, manufactured by Wako Pure Chemical Industries, Ltd.), 43 g (ammonia 10.1 g), was added at a rate of about 4 g/min. with a micro rotary pump, whereby slurry from which a hydrolyzed product had been precipitated was obtained. The hydrogen ion concentration of this slurry was pH 3.9. When this slurry was left at room temperature (about 25° C.) for 1 day, the hydrolyzed product was gelled to form a gelled material. The gelled material was dried in a thermostatic bath at 60° C. to give a dried mixture of the hydrolyzed product and the seed crystal particles. 100 parts by mass of the dried mixture contained 7 parts by mass of the seed crystal particles, in terms of metal component.

[Sintering]

Figure 4:
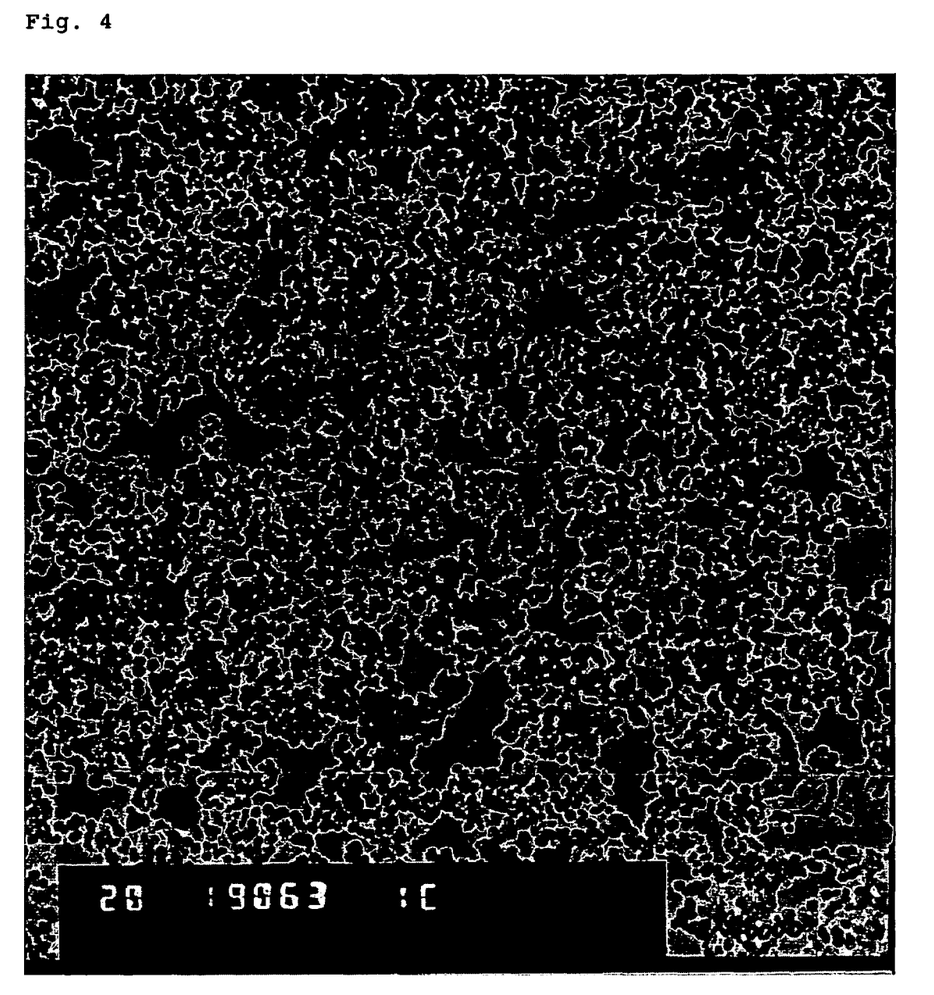
FIG. 4 is a transmission electron microphotograph of the fine α-alumina particles obtained in Example 7.

This dried mixture was ground to a powder with an alumina mortar, then placed in an alumina crucible, heated to 500° C. at a temperature increasing rate of 150° C./hour in the air in a box-shaped electric furnace and sintered at the same temperature for 1 hour and cooled to room temperature (about 25° C.). Thereafter, the particles were heated again to 860° C. at a temperature increasing rate of 300° C./hour in the air in the same electric furnace and sintered at the same temperature for 3 hours to give fine α-alumina particles. The fine α-alumina particles were highly white, and the degree of α-transformation was 96%, and the BET specific surface area was 27.2 m$^2$/g. When the fine α-alumina particles were observed under TEM, particles connected via necking to adjacent particles were not observed, and coarse particles having a particle diameter of greater than 100 nm were not observed either. A TEM photograph of the fine particles is shown in FIG. 4.

Comparative Example 1

[Production of Seed Crystal Particles]

20 parts by mass of the α-alumina particles (BET specific surface area, 16.6 m$^2$/g; degree of pulverization, 1.10; center particle diameter, 0.1 μm) obtained after milling in Example 1 were mixed with 80 parts by mass of an aqueous aluminum chloride solution (aluminum chloride concentration, 0.01 mol/L; hydrogen ion concentration, pH 2) and wet-dispersed continuously in an average retention time of 5 minutes with a wet dispersing machine (Dyno-Mill) filled with 2.9 kg alumina beads (beads diameter 0.65 mm), and then subjected to solid/liquid separation by centrifugation for 40 minutes at a revolution number of 4000 rpm (centrifugal acceleration of about 2100 G) to give, as a supernatant, slurry (solids content 1.5 mass %) containing the fine α-alumina particles (degree of pulverization, 1.4). When the particle diameters of the fine particles contained in the supernatant were determined in the same manner as in Example 1, per 524 fine particles having a particle diameter of 20 nm or less, the number of particles having a particle diameter of more than 20 nm and less than 100 nm was 60 and the number of particles having a particle diameter of 100 nm or more was 8.

[Production of Aluminum Hydrolyzed Product]

The resulting supernatant (solids content, 1.5 mass %), 284 g (fine α-alumina particles, 4.3 g), was mixed with 60.4 g (0.25 mol) of aluminum chloride hexahydrate (AlCl$_3$.6H$_2$O) (special grade in a powdery form, manufactured by Wako Pure Chemical Industries, Ltd.) at room temperature (about 25° C.), and while the mixture was stirred at the same temperature, 25% ammonia water (special grade, manufactured by Wako Pure Chemical Industries, Ltd.), 42.1 g (ammonia 10.1 g), was added at a rate of about 4 g/min. with a micro rotary pump, whereby slurry from which a hydrolyzed product had been precipitated was obtained. The hydrogen ion concentration of this slurry was pH 4.0. When this slurry was left at room temperature (about 25° C.) for 1 day, the hydrolyzed product was gelled to form a gelled material. The gelled material was dried in a thermostatic bath at 60° C. to give a dried mixture of the hydrolyzed product and the seed crystal particles. 100 parts by mass of the dried mixture contained 30 parts by mass of the seed crystal particles, in terms of metal component.

[Sintering]

Figure 5:
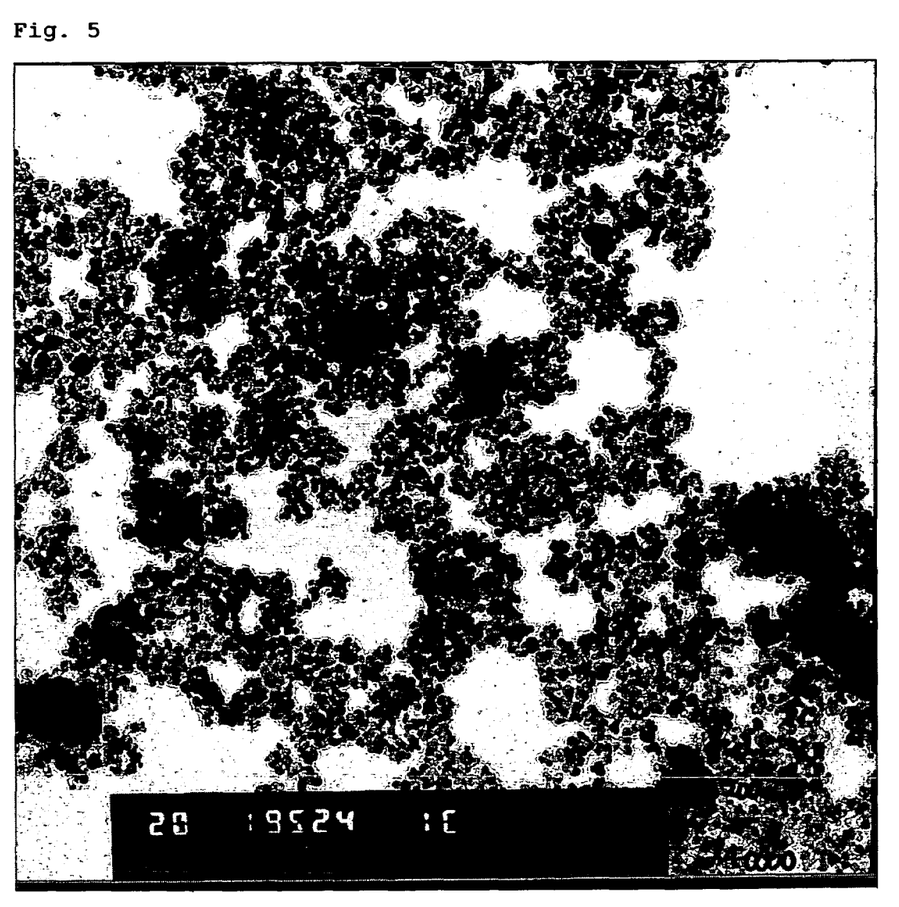
FIG. 5 is a transmission electron microphotograph of the fine α-alumina particles obtained in Comparative Example 1.

This dried mixture was ground to a powder with an alumina mortar, then placed in an alumina crucible, heated to 500° C. at a temperature increasing rate of 150° C./hour in the air in a box-shaped electric furnace and sintered at the same temperature for 1 hour and cooled to room temperature (about 25° C.). Thereafter, the particles were heated again to 880° C. at a temperature increasing rate of 300° C./hour in the air in the same electric furnace and sintered at the same temperature for 3 hours to give fine α-alumina particles. The fine α-alumina particles were slightly white, and the degree of α-transformation was 97%, and the BET specific surface area was 19.3 m$^2$/g. When the fine α-alumina particles were observed under TEM, particles connected via necking to adjacent particles were not observed, but coarse particles having a particle diameter of greater than 100 nm were observed. A TEM photograph of the fine particles is shown in FIG. 5.

What is claimed is:

1. A process for producing fine α-alumina particles, which comprises sintering a mixture of α-alumina precursor particles and seed crystal particles, wherein a center particle diameter of the seed crystal particles is 40 nm or less and a ratio of the number of coarse particles having a particle diameter greater than 100 nm to the number of the total particles is 1% or less.

2. The process according to claim 1, wherein the seed crystal particles are fine particles of a metallic compound obtained by milling an unmilled metallic compound such that the half width (H) of a main peak in the range of $45° \leq 2\theta \leq 70°$ in an X-ray diffraction spectrum thereof is at least 1.02 times as wide as the half width ($H_0$) before milling, and then classifying the resulting milled product by centrifuging it in an aqueous medium such that the product of centrifugal acceleration (G) by centrifugation time (min) is 140,000 (G·min) or more.

3. The process according to claim 1, wherein the seed crystal particles are fine particles of a metallic compound obtained by milling an unmilled metallic compound such that the half width (H) of a main peak in the range of $45° \leq 2\theta \leq 70°$ in an X-ray diffraction spectrum thereof is at least 1.02 times as wide as the half width ($H_0$) before milling, and then classifying the resulting milled product through a filter having a pore diameter of 1 μm or less.

4. Fine particles of a metallic compound, wherein the center particle diameter of the particles is 40 nm or less and the ratio of the number of particles having a particle diameter greater than 100 nm to the number of the total particles is 1% or less.

5. A process for producing fine particles of a metallic compound, wherein the center particle diameter of the particles is 40 nm or less and the ratio of the number of particles having a particle diameter greater than 100 nm to the number of the total particles is 1% or less, which process comprises the steps of milling an unmilled metallic compound such that the half width (H) of a main peak in the range of $45° \leq 2\theta \leq 70°$ in an X-ray diffraction spectrum thereof is at least 1.02 times as wide as the half width ($H_0$) before milling, and classifying the resulting milled product by centrifuging it in an aqueous medium such that the product of centrifugal acceleration (G) by centrifugation time (min) is 140,000 (G·min) or more.

6. A process for producing fine particles of a metallic compound, wherein the center particle diameter of the particles is 40 nm or less and the ratio of the number of particles having a particle diameter greater than 100 nm to the number of the total particles is 1% or less, which process comprises the steps of milling an unmilled metallic compound such that the half width (H) of a main peak in the range of $45° \leq 2\theta \leq 70°$ in an X-ray diffraction spectrum thereof is at least 1.02 times as wide as the half width ($H_0$) before milling, and classifying the resulting milled product through a filter having a pore diameter of 1 μm or less.

* * * * *